(12) United States Patent
Okada

(10) Patent No.: US 6,417,583 B1
(45) Date of Patent: Jul. 9, 2002

(54) LINEAR ACTUATOR WITH MOVABLE MAGNETS

(75) Inventor: Yukihiro Okada, Osaka (JP)

(73) Assignee: Matsushita Electric Industrial Co., Ltd. (JP)

( * ) Notice: Subject to any disclaimer, the term of this patent is extended or adjusted under 35 U.S.C. 154(b) by 69 days.

(21) Appl. No.: 09/684,548

(22) Filed: Oct. 6, 2000

(30) Foreign Application Priority Data

Oct. 8, 1999 (JP) ............................................ 11-288100

(51) Int. Cl.[7] ............................................... H02K 41/00
(52) U.S. Cl. ........................................ 310/12; 318/135
(58) Field of Search .............................. 310/12, 15, 17, 310/14, 20, 23, 30, 34; 335/220, 221, 222, 229, 250, 251, 255, 256, 278, 282; 318/135

(56) References Cited

U.S. PATENT DOCUMENTS 5,719,451 A * 2/1998 Cook et al. .................... 310/12

* cited by examiner

Primary Examiner—Nestor Ramirez
Assistant Examiner—Judson H. Jones

(74) Attorney, Agent, or Firm—Rossi & Associates

(57) ABSTRACT

The linear actuator with movable magnets includes a cylindrical inner yoke; a magnet holder disposed concentrically with the inner yoke via a clearance; a first and a second cylindrical magnets which are magnetized in the radial direction and held by the magnet holder in the axial direction; and an outer yoke disposed concentrically with the inner yoke. The magnetized directions of the two magnets are opposite to each other. The outer yoke has a first and a second coil-disposed sections, around which a first and a second driving coils are wound, respectively. The outer yoke also has a plurality of magnetic pole sections that oppose, via a clearance, to at least one of the first and the second magnets. Besides, in the actuator, dimensional requirements are defined for the magnetic pole and the magnets. That is, (i) the axial length of a magnetic pole section is not less than a movable stroke; (ii) the axial length of each first and second magnet is equal to the sum of the axial length of a magnetic pole section and the axial length of each first and second coil-disposed section, respectively. With the structure described above, a magnetic force is effectively obtained for keeping a sufficient thrust. This allows the magnets to be lightweight, advantageously saving costs and resources. The lightweight of the magnets can reduce the total weight of the whole moving parts, thereby realizing a higher acceleration.

12 Claims, 18 Drawing Sheets

LINEAR ACTUATOR WITH MOVABLE MAGNETS

FIELD OF THE INVENTION

The present invention relates to a linear actuator with movable magnets producing a liner driving force used in wide application areas including office automation (OA) equipment, controlling equipment, electronic equipment, machine tools, semiconductor- and liquid crystal display (LCD)-manufacturing equipment, and medical devices.

BACKGROUND OF THE INVENTION

In regard to a linear actuator with movable magnets (hereinafter referred simply to as an actuator), such a type illustrated in FIG. 19 has been generally used. FIG. 19 shows a cross-sectional view of a conventional actuator.

In FIG. 19, outer yoke 302 is disposed, via a clearance, concentrically with cylindrical inner yoke 301. Driving coils 3031 and 3032 are wound around outer yoke 302. In the clearance, disposed are permanent magnets 3041 and 3042 magnetized in each direction indicated by each arrow in FIG. 19, and magnet holder 305 that constitutes moving parts with the magnets.

Now will be explained about the workings of the conventional actuator with such structure described above.

Inner yoke 301, outer yoke 302, and magnets 3041, 3042 form a magnetic circuit. A magnetic flux generated by the magnets passes through the circuit. On the other hand, driving coils 3031 and 3032 generates another magnetic flux. A magnetic force from the magnetic action caused by these two fluxes effects on magnets 3041 and 3042, and acts as a thrust to move the moving parts.

In the conventional structure described above, however, dimensional, requirements are not specified for each section of magnetic pole 300 of outer yoke 302, magnets 3041 and 3042. When the moving parts move, an unwanted magnetic force opposite to a desired direction can be generated from a positional relation between each axial end of magnetic pole 300 and axial ends of magnets 3041 and 3042. It is therefore difficult for the conventional actuator to obtain effectively a magnetic force for keeping a sufficient thrust.

SUMMARY OF THE INVENTION

The present invention addresses the problems discussed above. According to the actuator of the present invention, a thrust is kept sufficiently due to an effectively obtained magnetic force. This allows the permanent magnets to be lightweight, which can advantageously save costs and resources. The lightweight of the magnets reduces the total weight of the whole moving parts. It is therefore possible to provide a linear actuator with movable magnet, realizing a higher acceleration.

The actuator of the present invention comprises the following elements:

(a) a cylindrical inner yoke;
(b) a magnet holder disposed concentrically with the inner yoke via a clearance;
(c) a first cylindrical magnet magnetized in the radial direction, and held by the magnet holder;
(d) a second cylindrical magnet magnetized in the radial direction opposite to that of the first magnet, which is held, as well as the first magnet, by the magnet holder in the axial direction; and
(e) an outer yoke disposed concentrically with the inner yoke. The outer yoke has a first and a second coil disposed sections around which a first and a second driving coils are wound, respectively. The outer yoke also has a plurality of magnetic pole sections that oppose, via a clearance, to at least one of the first magnet and the second magnet.

Besides, in the actuator of the present invention, dimensional requirements are defined for the magnetic pole sections and the magnets as follows:

(1) the axial length of each section of the magnetic pole sections is not less than a movable stroke; and
(2) the axial length of the first magnet is equal to the sum of the axial length of a magnetic pole section and the axial length of the first coil-disposed section; similarly, the axial length of the second magnet is equal to the sum of the axial length of a magnetic pole section and the axial length of the second coil-disposed section.

With the structure described above, a magnetic force is effectively obtained for keeping a sufficient thrust. This allows the permanent magnets to be lightweight, which can advantageously save costs and resources. The lightweight of the magnets can reduce the total weight of the whole moving parts, realizing a higher acceleration.

DETAILED DESCRIPTION OF THE PREFERRED EMBODIMENTS

The preferred embodiments of the present invention are described hereinafter with reference to the accompanying drawings.

First Preferred Embodiment

Figure 1:
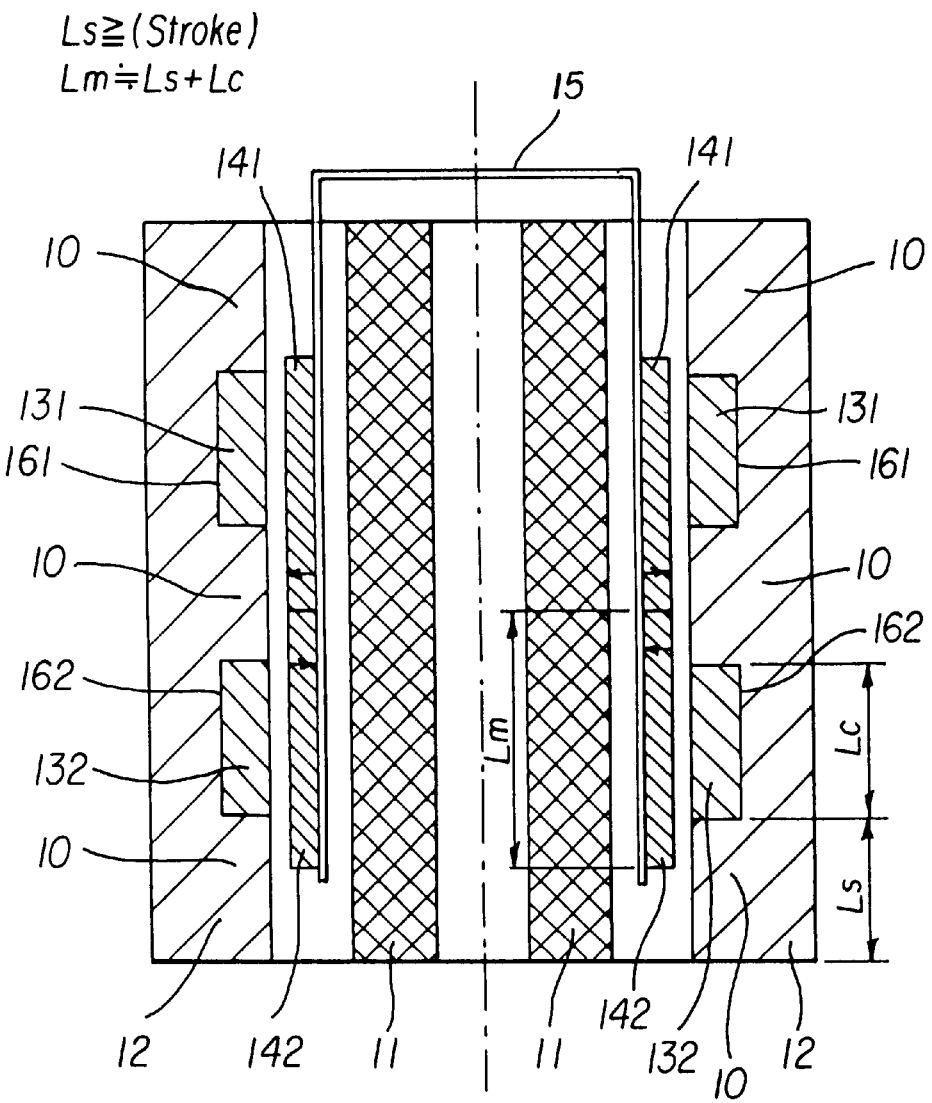
FIG. 1 shows a cross-sectional view of a linear actuator with movable magnets in accordance with a first preferred embodiment of the present invention.

FIG. 1 shows a cross-sectional view of a linear actuator with movable magnets (hereinafter referred simply to as an actuator) in accordance with the first preferred embodiment of the present invention.

Magnet holder 15 is disposed concentrically with cylindrical inner yoke 11 via a clearance. Holder 15 holds first permanent magnet 141 and second permanent magnet 142, both of which are cylindrical shaped and magnetized in the radial direction. However, as shown in FIG. 1, the magnetized directions of magnets 141 and 142 are opposite to each other. Holder 15 holds magnets 141 and 142 in "stack-up" arrangement in the axial direction.

Outer yoke 12 is disposed concentrically with inner yoke 11. The outer yoke has first and second coil-disposed sections 161, 162 around which first driving coil 131 and second driving coil 132 are wound, respectively. Both of coils 131 and 132 are wound in a ring shape, surrounding holder 15 that holds magnets 141 and 142. When coils 131 and 132 are energized, magnetic pole 10 having three sections is formed in outer yoke 12. Each section of magnetic pole 10 faces to at least one of magnets 141 and 142 via a clearance.

Besides, in the actuator of the embodiment, dimensional requirements are defined for the magnetic pole sections and the magnets as follows:

(1) the axial length of each section of magnetic pole 10 is not less than a movable stroke;

(2) the axial length of magnet 141 is equal to the sum of the axial length of a section of magnetic pole 10 and the axial length of coil-disposed section 161, similarly, the axial length of magnet 142 is equal to the sum of the axial length of a section of magnetic pole 10 and the axial length of coil-disposed section 162. The movable stroke mentioned above is the maximum length the moving parts (i.e., magnet holder 15 holding two magnets 141, 142) are allowed to move relative to the stationary parts (i.e., inner yoke 11 and outer yoke 12.)

The working principle of the actuator with such structure is described below.

Inner yoke 11, outer yoke 12, and magnets 141, 142 form a magnetic circuit. A magnetic flux generated by the magnets passes through the circuit via a clearance. On the other hand, driving coils 131 and 132 generates another magnetic flux. A magnetic force from the magnetic action caused by these two fluxes effects on magnets 141 and 142, and acts as a thrust to move the moving parts.

Now will be discussed the thrust-generating mechanism in a little more detail.

Suppose that magnets 141 and 142 form the North pole and the South pole at the surfaces which face to outer yoke 12, respectively. Referring to FIG. 1, now coil 131 is energized so that the top section of the magnetic pole forms the South pole, and the middle section of the magnetic pole forms the North pole. On the other hand, coil 132 is energized so that the middle section of the magnetic pole forms the North pole, and the bottom section of the magnetic pole forms the South pole. With the state, the North pole of magnet 141 is attracted to the South pole formed at the top section of the magnetic pole, and at the same time, repelled from the North pole formed at the middle section of the magnetic pole. On the other hand, the South pole of magnet 142 is attracted to the North pole formed at the middle section of the magnetic pole, and at the same time, repelled from the South pole formed at the bottom section of the magnetic pole. In this way, the attracting and repelling of the magnet force generates a thrust to magnets 141 and 142 in an upward direction in FIG. 1, moving thereby the moving parts straight upwardly. Needless to say, when the directions of current fed to coils 131 and 132 are respectively reversed from the directions described above, the magnetic poles of the three magnetic sections (top, middle, and bottom) are respectively reversed, allowing the moving parts to back downwardly to the original position.

According to the embodiment, the axial length of each section of magnetic pole 10 of outer yoke 12, which is indicated as "Ls" in FIG. 1, is defined to be not less than a movable stroke. Furthermore, the axial length of magnets 141, 142 (indicated as "Lm") is defined to be equal to the sum of the axial length of a section of magnetic pole 10 (indicated as "Ls") and the axial length of coil-disposed sections 161, 162 (indicated as "Lc"), respectively. That is, magnets 141, 142 and each section of magnetic pole 10 are sized so as to meet the equation: Lm=Ls+Lc.

As described above, a positional relation between each axial end of magnetic pole 10 and axial ends of magnets 141 and 142 generates a thrust. Due to the properly sized structure, however, an unwanted force opposite to the thrust is minimized. This makes therefore possible to effectively obtain a magnetic force for keeping a sufficient thrust.

Although the case in which coils 131 and 132 are wound around outer yoke 12 is discussed here, it is also effective that those coils are wound around inner yoke 11 instead.

Second Preferred Embodiment

Figure 2:
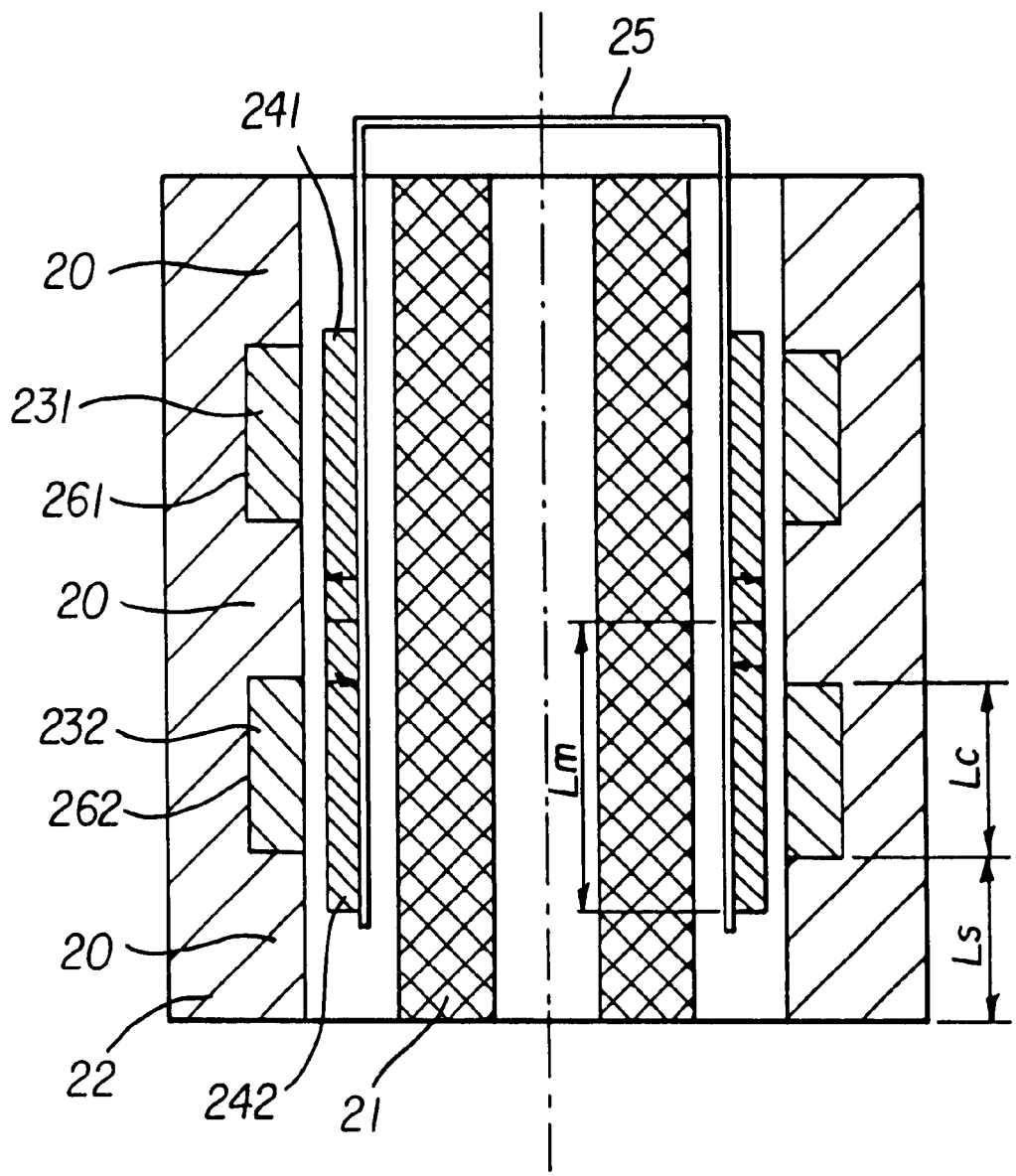
FIG. 2 shows a cross-sectional view of the actuator in accordance with a second preferred embodiment of the present invention.

FIG. 2 shows a cross-sectional view of an actuator in accordance with the second preferred embodiment of the present invention.

In FIG. 2, the following elements correspond to the elements explained in the first embodiment, having the same dimensions:

(a) inner yoke 21;

(b) outer yoke 22;

(c) magnet holder 25;

(d) held by magnet holder 25, permanent magnets 241 and 242 energized in each direction indicated by arrows in FIG. 2;

(e) driving coil 231 wound around coil-disposed section 261 of outer yoke 22;

(f) driving coil 232 wound around coil-disposed section 262 of outer yoke 22;

(g) magnetic pole 20 of outer yoke 22.

Figure 3:
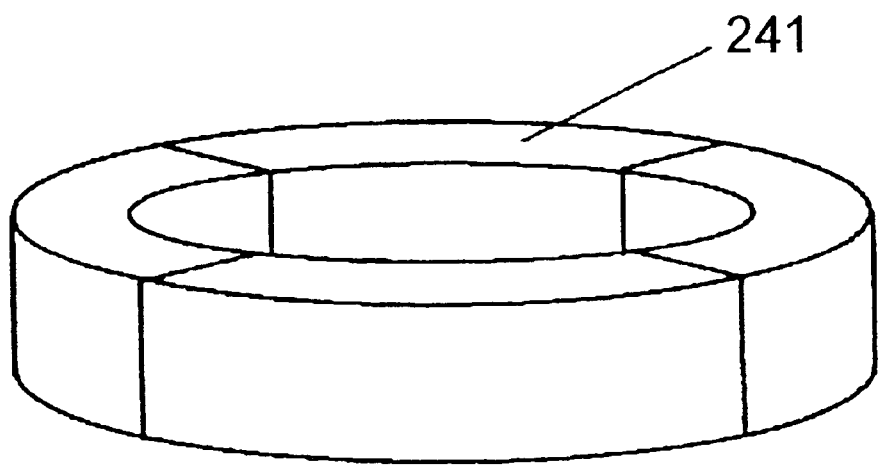
FIG. 3 shows a bird's eye view of permanent magnets in accordance with the second preferred embodiment of the present invention.

The difference between the first and the second embodiments is, as shown in FIG. 3, that magnet 241 and magnet 242 (which is not shown in FIG. 3) are separated in a circumferential direction.

Now will be discussed how the actuator of the embodiment structured above works.

Inner yoke 21, outer yoke 22, and magnets 241, 242 form a magnetic circuit. A magnetic flux generated by the magnets passes through the circuit. On the other hand, driving coils 231 and 232 generates another magnetic flux. A magnetic force from the magnetic action caused by these two fluxes effects on magnets 241 and 242, then acts as a thrust to move the moving parts including magnets 241, 242 and magnet holder 25. Besides, in the structure, the following elements are sized so as to meet the following dimensional requirements:

(1) the axial length of magnetic pole 20 of outer yoke 22, which is indicated as "Ls" in FIG. 2, is defined to be not less than a movable stroke; and (2) the axial length of magnets 241, 242 (indicated as "Lm") is defined to be equal to the sum of the axial length of a section of magnetic pole 20 (indicated as "Ls") and the axial length of coil-disposed sections 261, 262 (indicated as "Lc"), respectively: Lm=Ls+Lc.

A positional relation between each axial end of magnetic pole 20 and axial ends of magnets 241 and 242 generates a thrust. The properly sized structure mentioned above minimizes an unwanted force opposite to the thrust. This makes therefore possible to effectively obtain a magnetic force for keeping a sufficient thrust.

Furthermore, according to the actuator in the embodiment, magnets 241 and 242 are separated in a circumferential direction. Such structured magnet can be easily energized and assembled.

Although the case in which coils 231 and 232 are wound around outer yoke 22 is discussed here, it is also effective that those coils are wound around inner yoke 21 instead.

Third Preferred Embodiment

Figure 4:
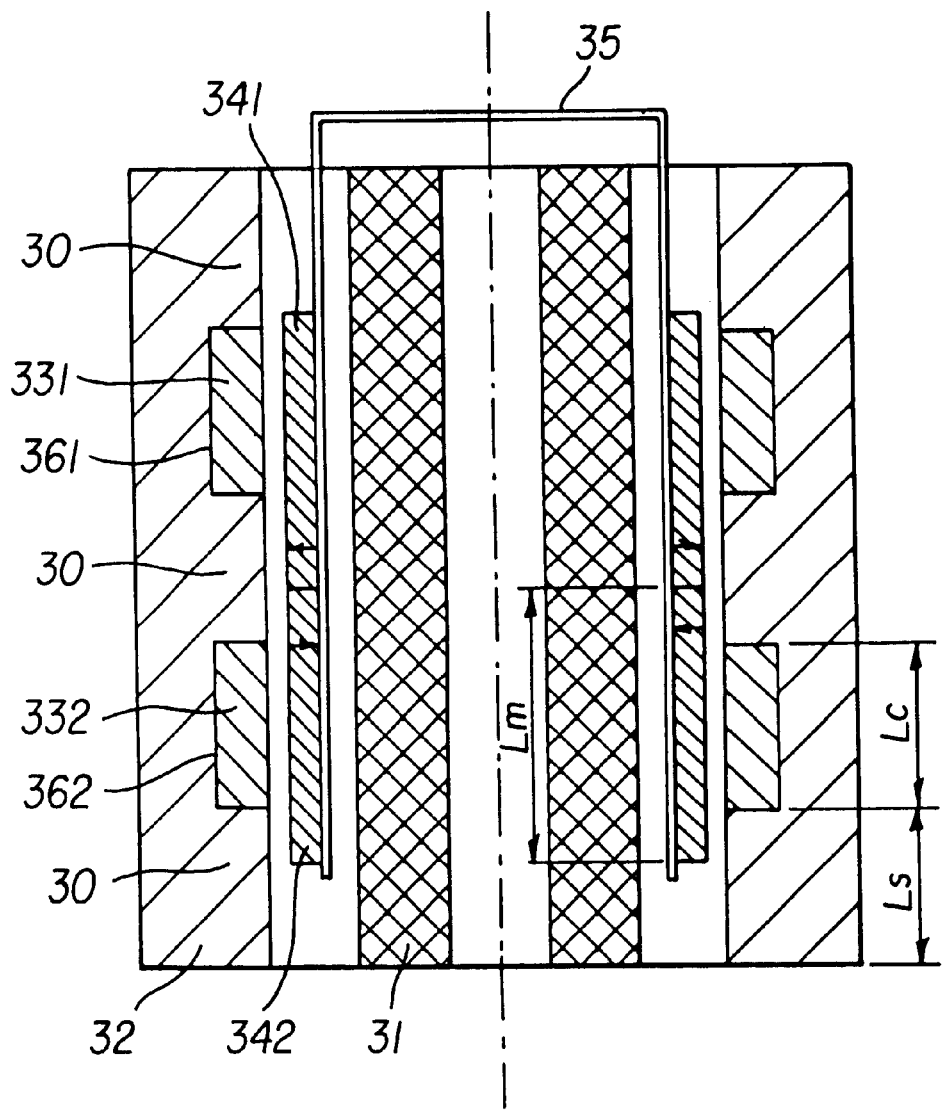
FIG. 4 shows a cross-sectional view of the actuator in accordance with a third preferred embodiment of the present invention.

FIG. 4 shows a cross-sectional view of an actuator in accordance with the third preferred embodiment of the present invention.

In FIG. 4, the following elements correspond to the elements explained in the first embodiment, having the same dimensions:

(a) inner yoke 31;

(b) outer yoke 32;

(c) magnet holder 35;

(d) held by magnet holder 35, permanent magnets 341 and 342 energized in each direction indicated by arrows in FIG. 4;

(e) driving coil 331 wound around coil-disposed section 361 of outer yoke 32;

(f) driving coil 332 wound around coil-disposed section 362 of outer yoke 32;

(g) magnetic pole 30 of outer yoke 32.

Figure 5:
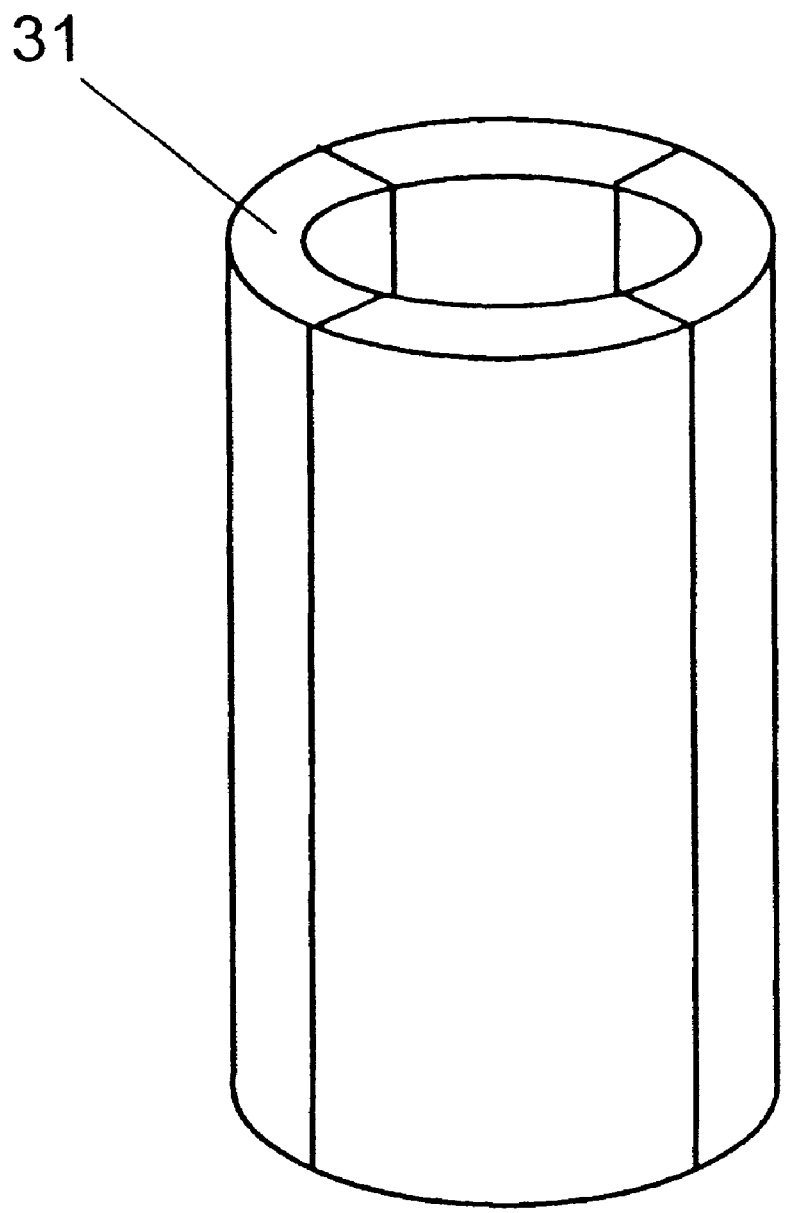
FIG. 5 shows a bird's eye view of an inner yoke in accordance with the third preferred embodiment of the present invention.

The actuator of the embodiment differs from that of the first embodiment, as shown in FIG. 5, in that inner yoke 31 and outer yoke 32 (which is not shown in FIG. 5) are separated in a circumferential direction.

Now will be discussed how the actuator of the embodiment structured above works.

Inner yoke 31, outer yoke 32, and magnets 341, 342 form a magnetic circuit. A magnetic flux generated by the magnets passes through the circuit. On the other hand, driving coils 331 and 332 generates another magnetic flux. A magnetic force from the magnetic action caused by these two fluxes effects on magnets 341 and 342, then acts as a thrust to move the moving parts including magnets 341, 342 and magnet holder 35. Besides, in the structure, the following elements are sized so as to meet the following dimensional requirements:

(1) the axial length of magnetic pole 30 of outer yoke 32, which is indicated as "Ls" in FIG. 4, is defined to be not less than a movable stroke; and (2) the axial length of magnets 341, 342 (indicated as "Lm") is defined to be equal to the sum of the axial length of a section of magnetic pole 30 (indicated as "Ls") and the axial length of coil-disposed sections 361, 362 (indicated as "Lc"), respectively: Lm=Ls+Lc.

A positional relation between each axial end of magnetic pole 30 and axial ends of magnets 341 and 342 generates a thrust. The precisely sized structure mentioned above minimizes an unwanted force opposite to the thrust. This makes therefore possible to effectively obtain a magnetic force for keeping a sufficient thrust.

Furthermore, according to the actuator in the embodiment, inner yoke 31 and outer yoke 32 are separated in a circumferential direction. The separated structure suppresses generation of eddy currents in those yokes and a heat that accompanies it, minimizing an eddy current loss to the actuator. Besides, such a structure promises an easy assembling.

Although the case in which coils 331 and 332 are wound around outer yoke 32 is discussed here, it is also effective that those coils are wound around inner yoke 31 instead.

Fourth Preferred Embodiment

Figure 6:
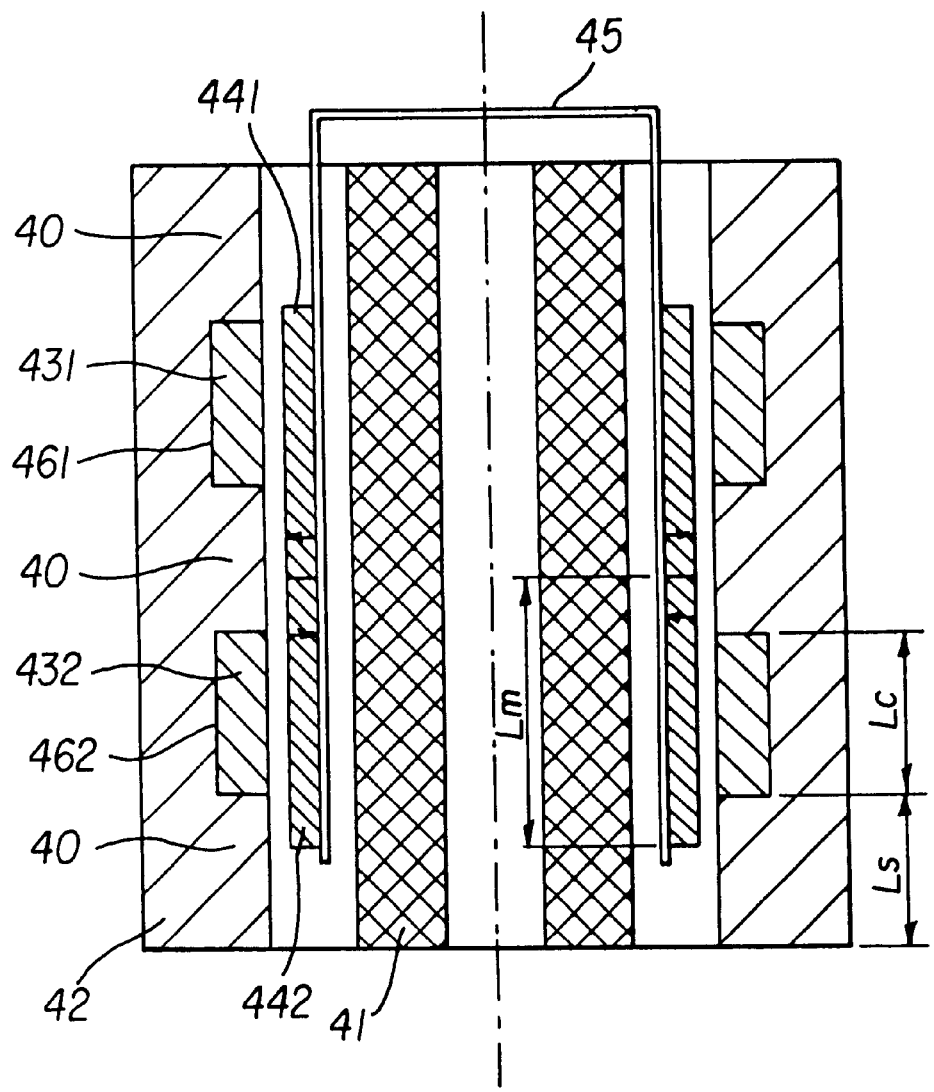
FIG. 6 shows a cross-sectional view of the actuator in accordance with a fourth preferred embodiment of the present invention.

FIG. 6 shows a cross-sectional view of an actuator in accordance with the fourth preferred embodiment of the present invention.

In FIG. 6, the following elements correspond to the elements explained in the first embodiment, having the same dimensions:

(a) inner yoke 41;

(b) outer yoke 42;

(c) magnet holder 45;

(d) held by magnet holder 45, permanent magnets 441 and 442 energized in each direction indicated by arrows in FIG. 6;

(e) driving coil 431 wound around coil-disposed section 461 of outer yoke 42;

(f) driving coil 432 wound around coil-disposed section 462 of outer yoke 42;

(g) magnetic pole 40 of outer yoke 42.

Figure 7:
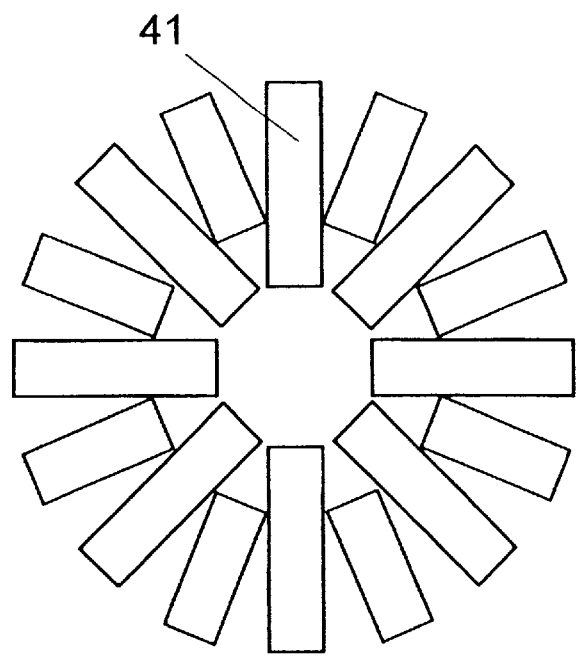
FIG. 7 shows a top view of the inner yoke in accordance with the fourth preferred embodiment of the present invention.

The actuator of the embodiment differs from that of the first embodiment in that inner yoke 41 and outer yoke 42 (which is not shown in FIG. 7) are formed as a multi-layered structure made of thin plates, laminated in a circumferential direction.

The working principle of the actuator of the embodiment structured above is the same as that of the actuator of the first preferred embodiment. As an advantageous feature, according to the embodiment, inner yoke 41 and outer yoke 42 are formed as multi-layered structures laminated in a circumferential direction. The laminated structure decreases generation of eddy currents in those yokes and a heat that accompanies it, so that an eddy current loss to the actuator is minimized.

Although the case in which coils 431 and 432 are wound around outer yoke 42 is discussed here, it is also effective that those coils are wound around inner yoke 41 instead.

Figure 8:
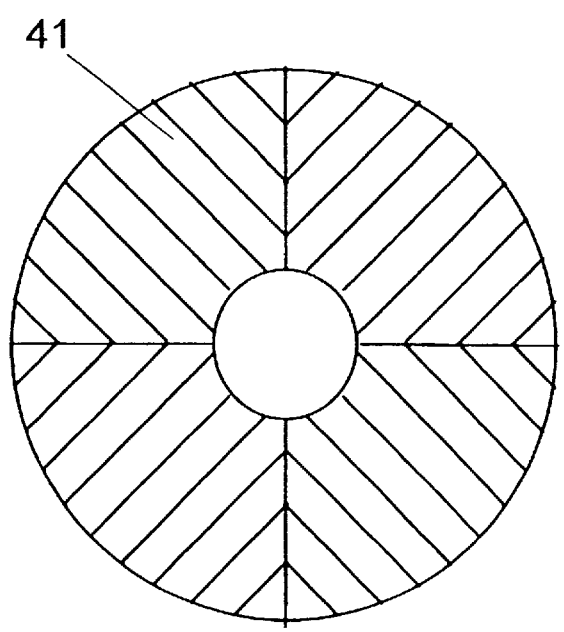
FIG. 8 shows a top view of another inner yoke in accordance with the fourth preferred embodiment of the present invention.

It is also possible that inner yoke 41 and outer yoke 42 are laminated in such a way shown in FIG. 8 (in which outer yoke 42 is not shown.)

Fifth Preferred Embodiment

Figure 9:
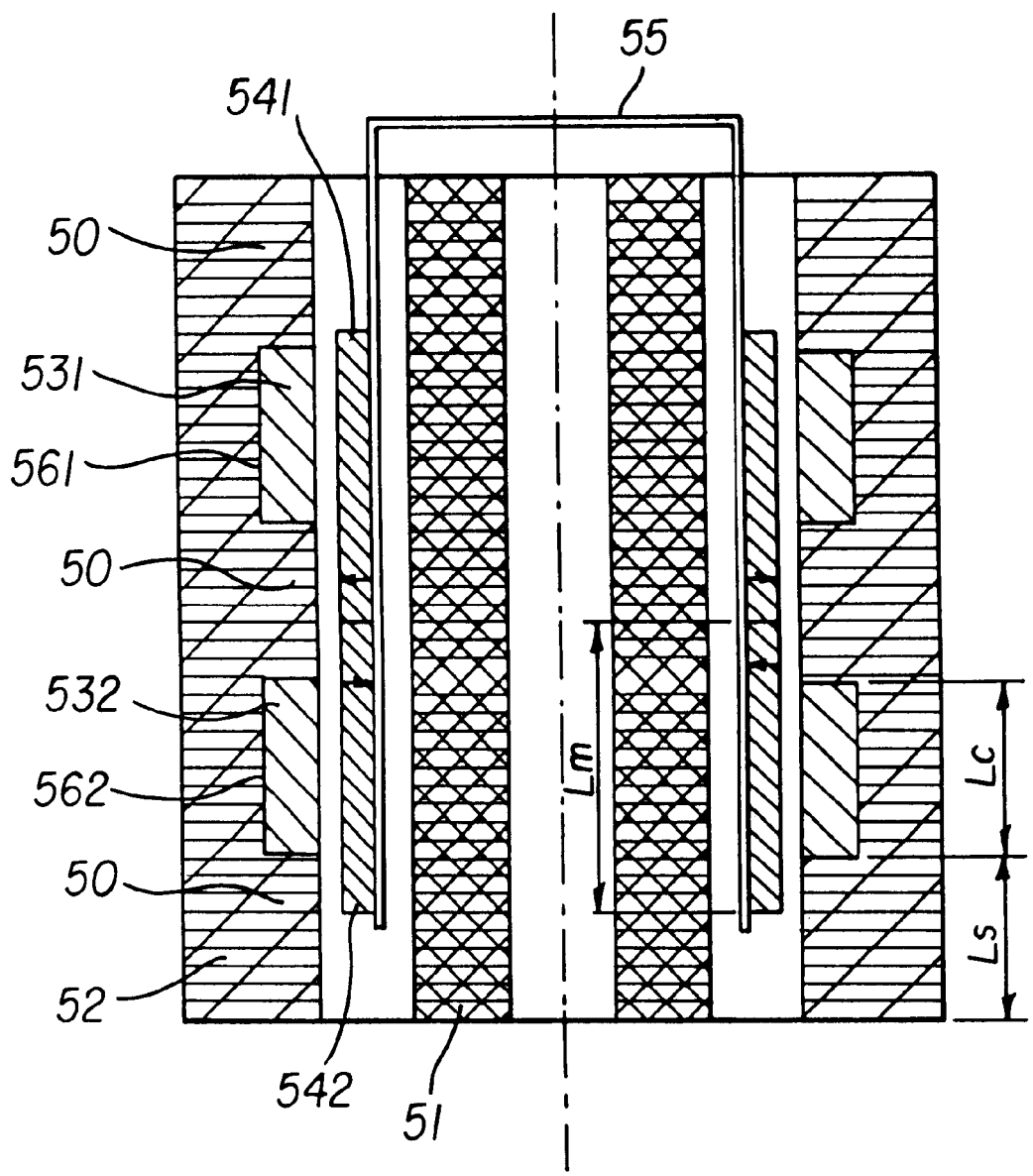
FIG. 9 shows a cross-sectional view of the actuator in accordance with a fifth preferred embodiment of the present invention.

FIG. 9 shows a cross-sectional view of an actuator in accordance with the fifth preferred embodiment of the present invention.

In FIG. 9, the following elements correspond to the elements explained in the first embodiment, having the same dimensions:

(a) inner yoke 51;
(b) outer yoke 52;
(c) magnet holder 55;.
(d) held by magnet holder 55, permanent magnets 541 and 542 energized in each direction indicated by arrows in FIG. 9;
(e) driving coil 531 wound around coil-disposed section 561 of outer yoke 52;
(f) driving coil 532 wound around coil-disposed section 562 of outer yoke 52;
(g) magnetic pole 50 of outer yoke 52.

Figure 10:
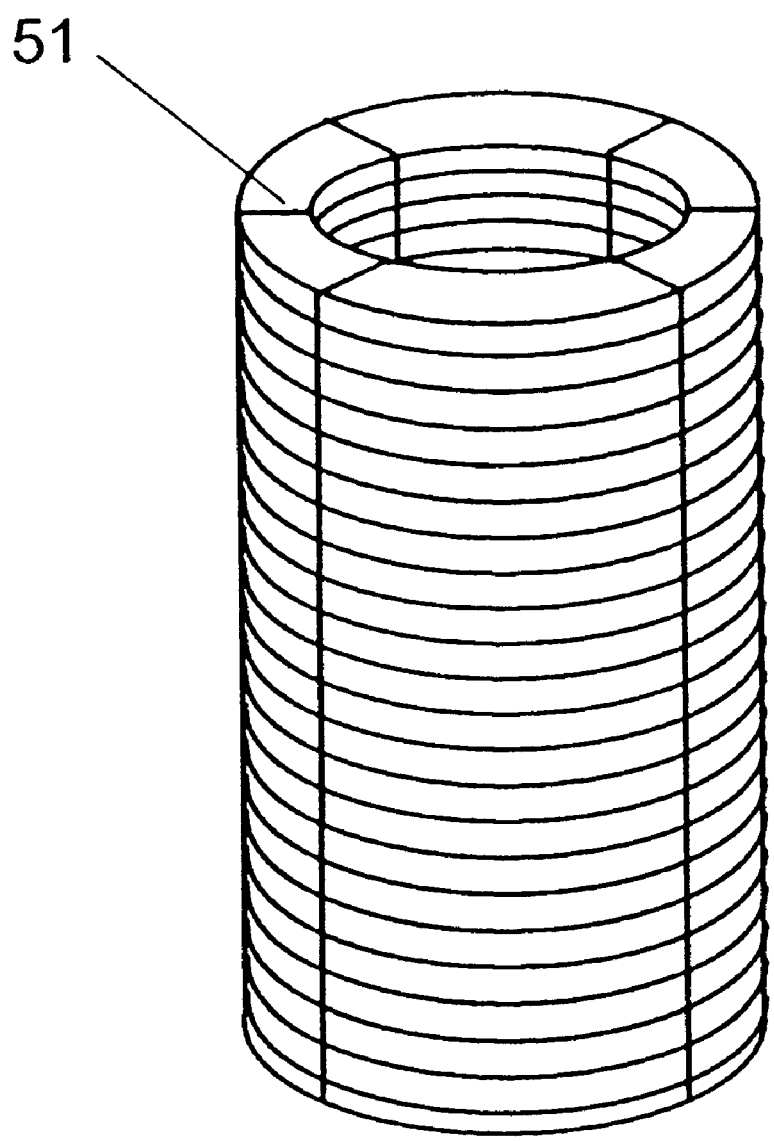
FIG. 10 shows a bird's eye view of the inner yoke in accordance with the fifth preferred embodiment of the present invention.

The actuator of the embodiment differs from that of the first embodiment in that inner yoke 51 and outer yoke 52 are, as shown in FIG. 10 (in which outer yoke 52 is not shown), separated circumferentially and laminated axially.

The working principle of the actuator of the embodiment structured above is the same as that of the actuator of the first preferred embodiment. As an advantageous feature, according to the embodiment, inner yoke 51 and outer yoke 52 are not only separated circumferentially, but also formed as multilayered structures, laminated axially. The structure suppresses generation of eddy currents in those yokes and a heat that accompanies it, with an eddy current loss to the actuator minimized. As another definite plus, such a structure makes the assembling work simple.

Although the case in which coils 531 and 532 are wound around outer yoke 52 is discussed here, it is also effective that those coils are wound around inner yoke 51 instead.

Sixth Preferred Embodiment

Figure 11:
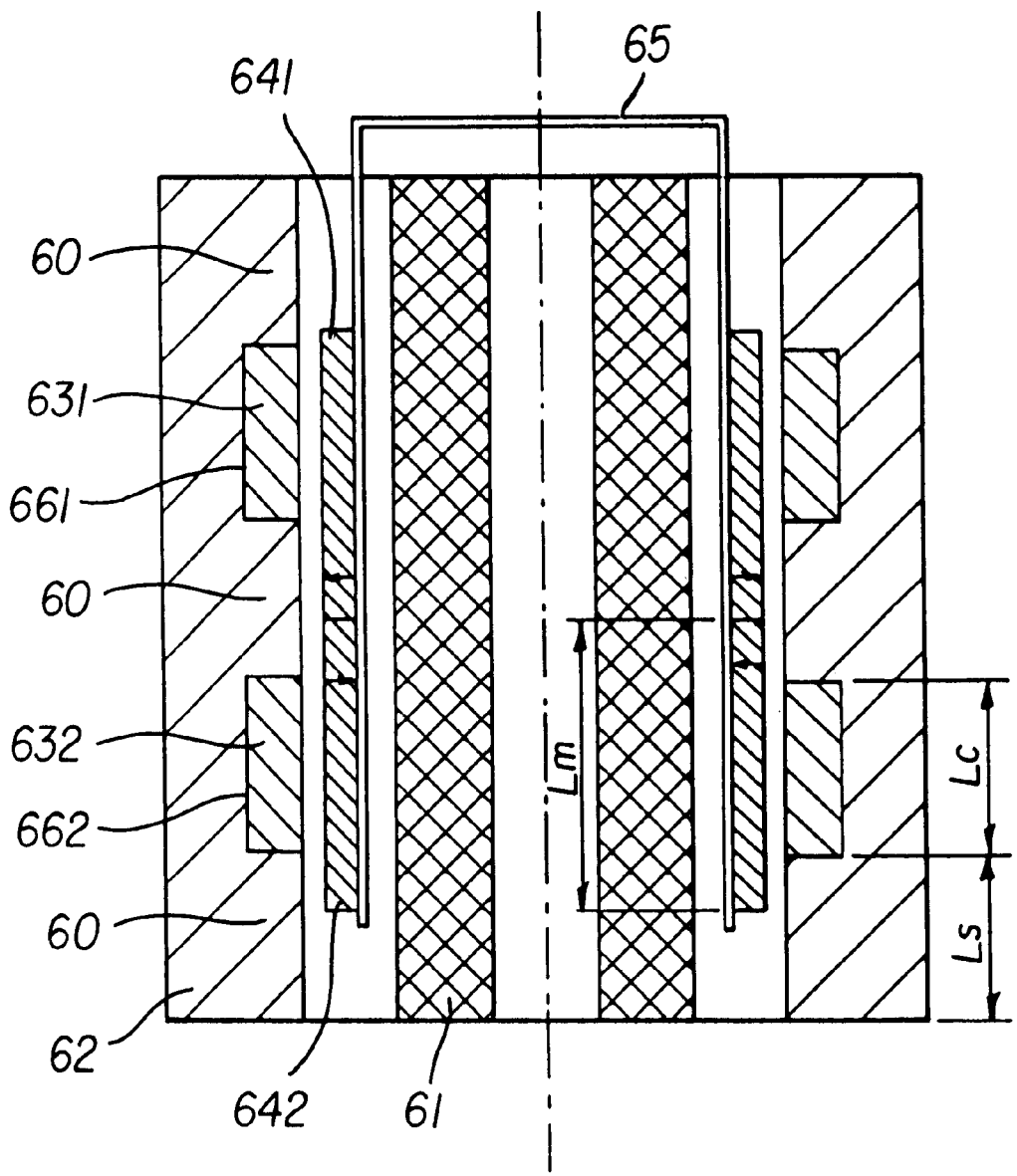
FIG. 11 shows a cross-sectional view of the actuator in accordance with a sixth preferred embodiment of the present invention.

FIG. 11 shows a cross-sectional view of an actuator in accordance with the sixth preferred embodiment of the present invention.

In FIG. 11, the following elements correspond to the elements explained in the first embodiment, having the same dimensions:

(a) inner yoke 61;
(b) outer yoke 62;
(c) magnet holder 65;
(d) held by magnet holder 65, permanent magnets 641 and 642 energized in each direction indicated by arrows in FIG. 11
(e) driving coil 631 wound around coil-disposed section 661 of outer yoke 62;
(f) driving coil 632 wound around coil-disposed section 662 of outer yoke 62;
(g) magnetic pole 60 of outer yoke 62.

The actuator of the embodiment differs from that of the first embodiment in that inner yoke 61 and outer yoke 62 are made of a magnetic plate having magnetic-direction characteristics, instead of a thin plate.

The working principle of the actuator of the embodiment structured above is the same as that of the actuator of the first preferred embodiment. As an advantageous feature, according to the embodiment, the magnetic plate having magnetic-direction characteristics, which forms inner yoke 61 and outer yoke 62, minimizes magnetic resistance of the yokes and provides a greater thrust.

Although the case in which coils 631 and 632 are wound around outer yoke 62 is discussed here, it is also effective that those coils are wound around inner yoke 61 instead.

Seventh Preferred Embodiment

Figure 12:
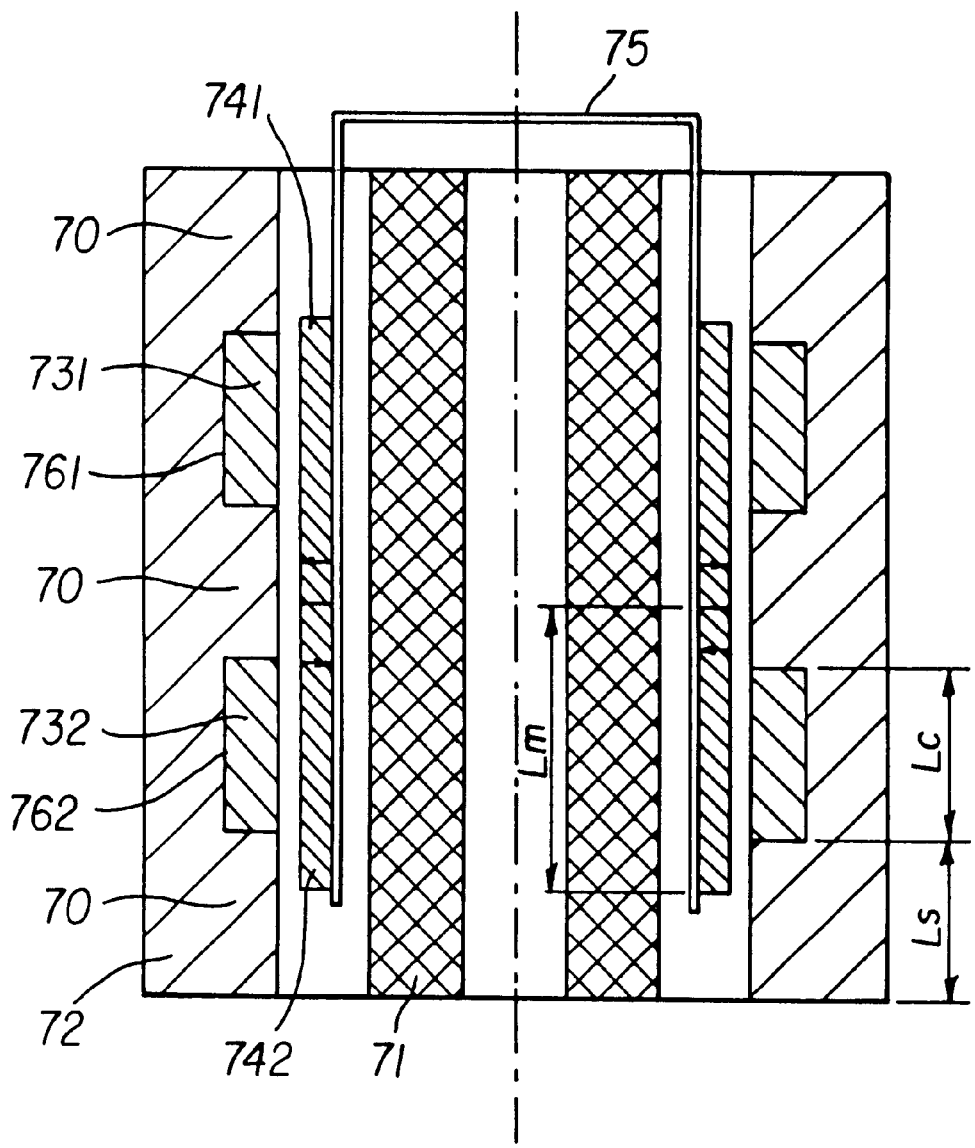
FIG. 12 shows a cross-sectional view of the actuator in accordance with a seventh preferred embodiment of the present invention.

FIG. 12 shows a cross-sectional view of an actuator in accordance with the seventh preferred embodiment of the present invention.

In FIG. 12, the following elements correspond to the elements explained in the first embodiment, having the same dimensions:

(a) inner yoke 71;
(b) outer yoke 72;
(c) magnet holder 75;
(d) held by magnet holder 75, permanent magnets 741 and 742 energized in each direction indicated by arrows in FIG. 12;
(e) driving coil 731 wound around coil-disposed section 761 of outer yoke 72;
(f) driving coil 732 wound around coil-disposed section 762 of outer yoke 72;
(g) magnetic pole 70 of outer yoke 72.

The actuator of the embodiment differs from that of the first embodiment in that a non-magnetic material with high electrical resistance is employed for holder 75.

The working principle of the actuator of the embodiment structured above is the same as that of the actuator of the first preferred embodiment. As an advantageous feature, according to the embodiment, a non-magnetic material with high electrical resistance, which forms holder 75, suppresses generation of eddy currents in the holder and a heat that accompanies it, with an eddy current loss to the actuator minimized. Furthermore, it contributes to suppress the demagnetization of magnets 741 and 742 caused by the heat generated from holder 75.

Although the case in which coils 731 and 732 are wound around outer yoke 72 is discussed here, it is also effective that those coils are wound around inner yoke 71 instead.

Eighth Preferred Embodiment

Figure 13:
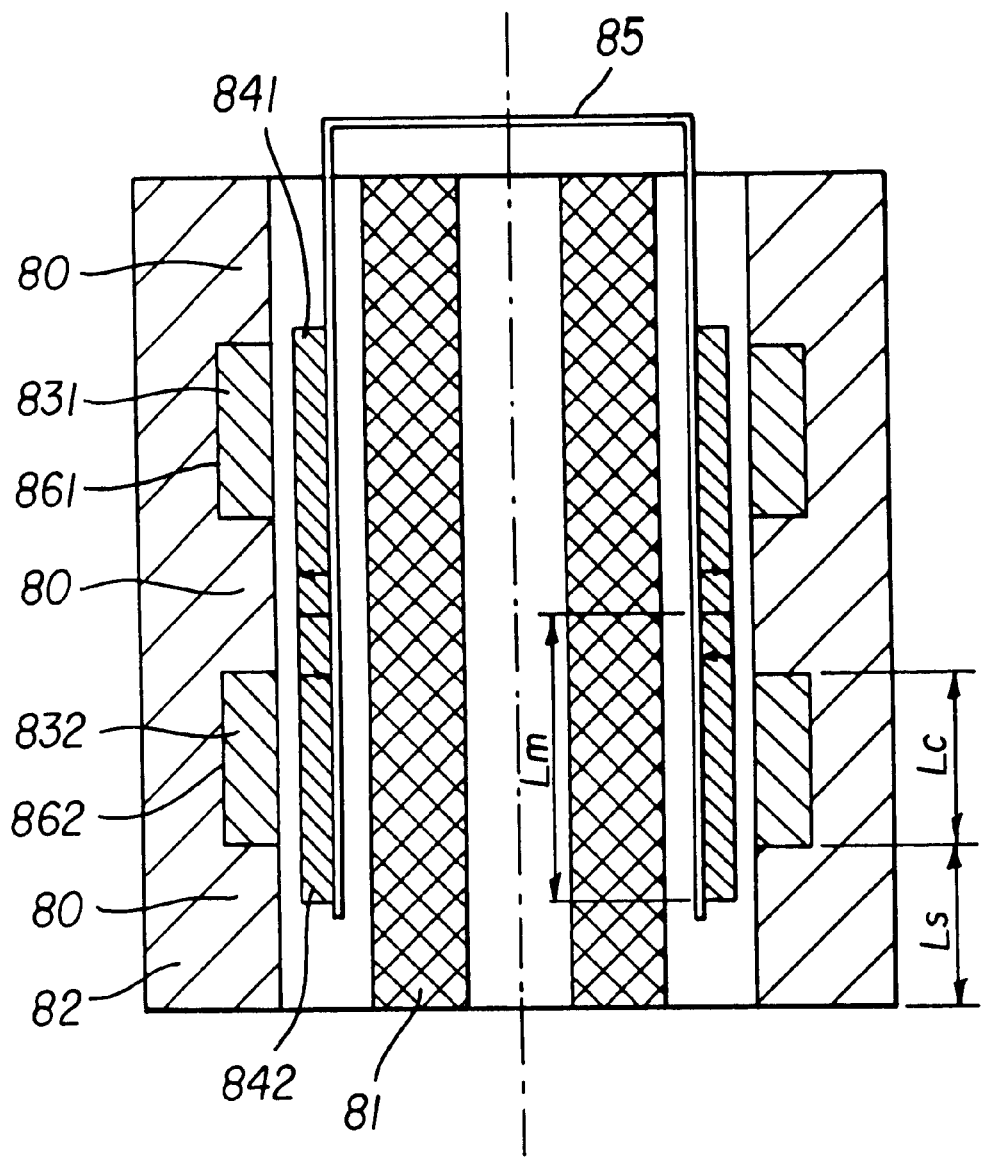
FIG. 13 shows a cross-sectional view of the actuator in accordance with a eighth preferred embodiment of the present invention.
Figure 14:
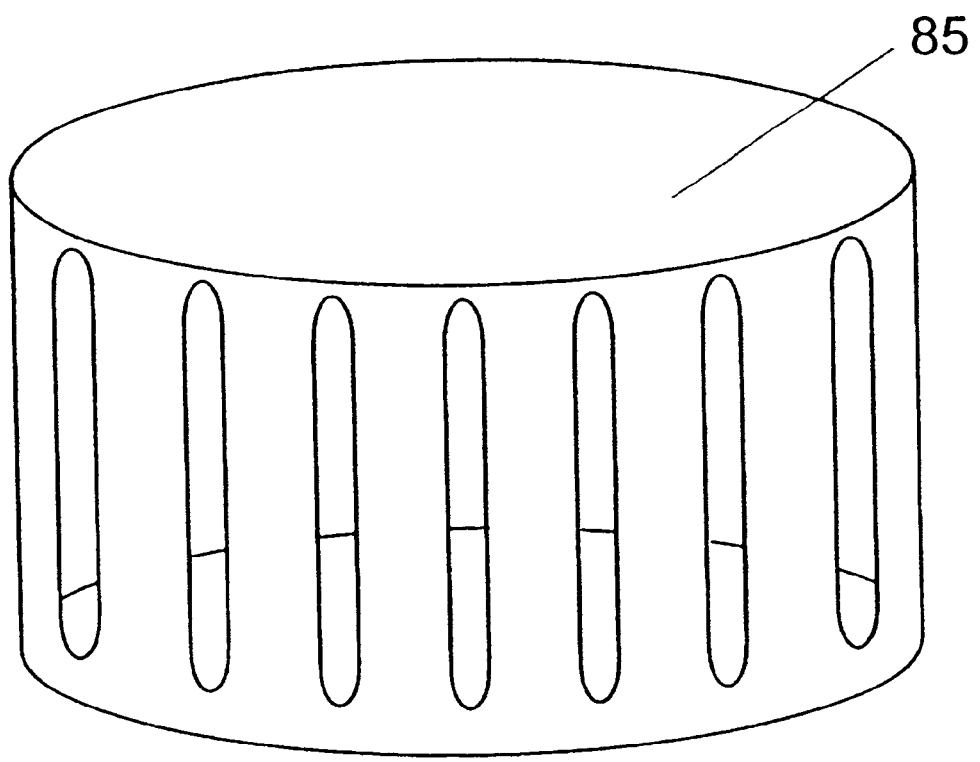
FIG. 14 shows a bird's eye view of a magnet holder in accordance with the eighth preferred embodiment of the present invention.

FIG. 13 shows a cross-sectional view of an actuator in accordance with the eighth preferred embodiment of the present invention.

In FIG. 13, the following elements correspond to the elements explained in the first embodiment, having the same dimensions:

(a) inner yoke 81;
(b) outer yoke 82;
(c) magnet holder 85;
(d) held by magnet holder 85, permanent magnets 841 and 842 energized in each direction indicated by arrows in FIG. 13;
(e) driving coil 831 wound around coil-disposed section 861 of outer yoke 82;
(f) driving coil 832 wound around coil-disposed section 862 of outer yoke 82;
(g) magnetic pole 80 of outer yoke 82.

The actuator of the embodiment differs from that of the first embodiment in that a plurality of slits are formed in holder 85.

The working principle of the actuator of the embodiment structured above is the same as that of the actuator of the first preferred embodiment. As an advantageous feature, according to the embodiment, the slits-formed structure suppresses generation of eddy currents generated in holder 85 and a heat that accompanies it, with an eddy current loss to the actuator minimized. Furthermore, it contributes to suppress the demagnetization of magnets 841 and 842 caused by the heat generated from holder 85.

Although the case in which coils 831 and 832 are wound around outer yoke 82 is discussed here, it is also effective that those coils are wound around inner yoke 81 instead.

Ninth Preferred Embodiment

Figure 15:
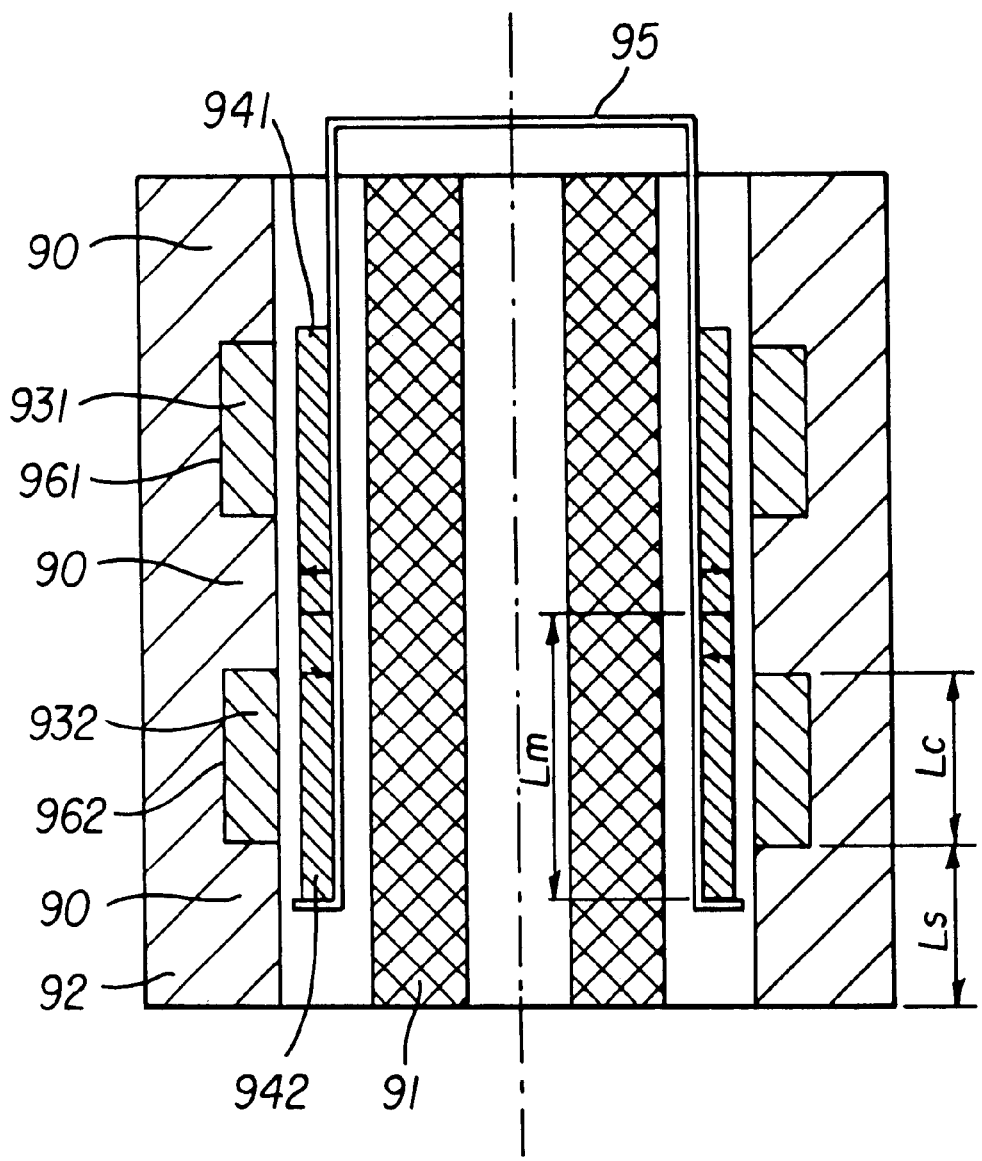
FIG. 15 shows a cross-sectional view of the actuator in accordance with a ninth preferred embodiment of the present invention.

FIG. 15 shows a cross-sectional view of an actuator in accordance with the ninth preferred embodiment of the present invention.

In FIG. 15, the following elements correspond to the elements explained in the first embodiment, having the same dimensions:

(a) inner yoke 91;

(b) outer yoke 92;

(c) magnet holder 95;

(d) held by magnet holder 95, permanent magnets 941 and 942 energized in each direction indicated by arrows in FIG. 15;

(e) driving coil 931 wound around coil-disposed section 961 of outer yoke 92;

(f) driving coil 932 wound around coil-disposed section 962 of outer yoke 92;

(g) magnetic pole 90 of outer yoke 92.

Figure 16:
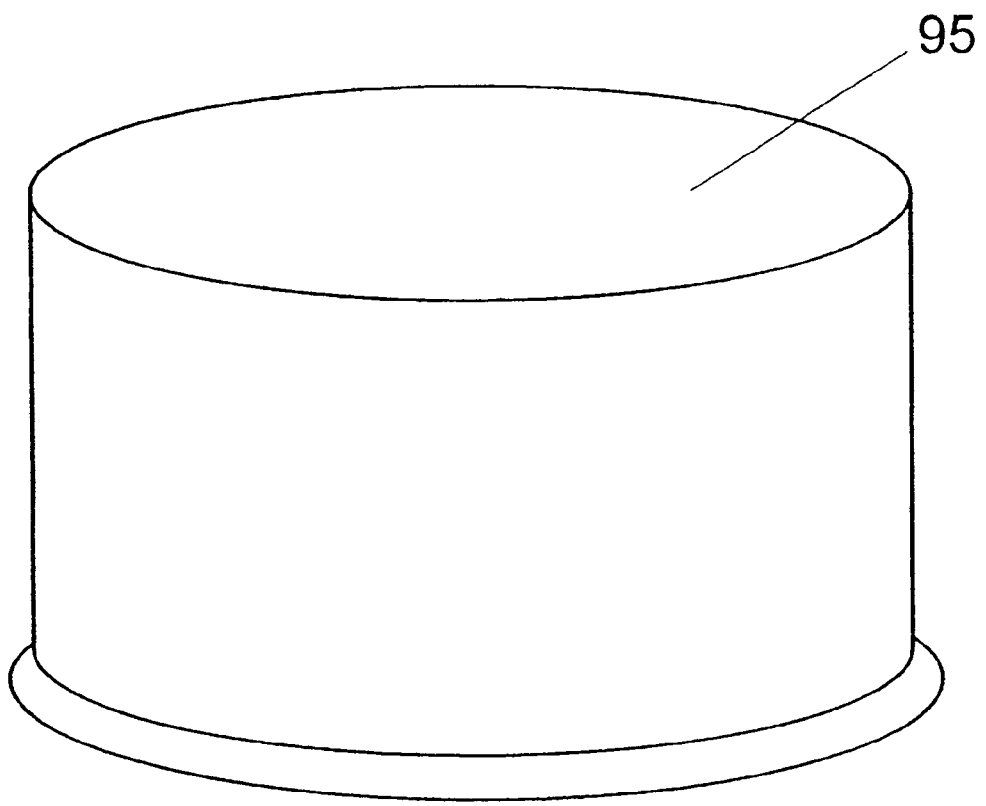
FIG. 16 shows a bird's eye view of the magnet holder in accordance with the ninth preferred embodiment of the present invention.

The actuator of the embodiment differs from that of the first embodiment, as shown in FIG. 16, in that the end of holder 95 is shaped like a letter L.

The working principle of the actuator of the embodiment structured above is the same as that of the actuator of the first preferred embodiment. As an advantageous feature, according to the embodiment, the L-shaped end of holder 95 can set magnet 942 at a suitable position.

Although the case in which coils 931 and 932 are wound around outer yoke 92 is discussed here, it is also effective that those coils are wound around inner yoke 91 instead.

Tenth Preferred Embodiment

Figure 17:
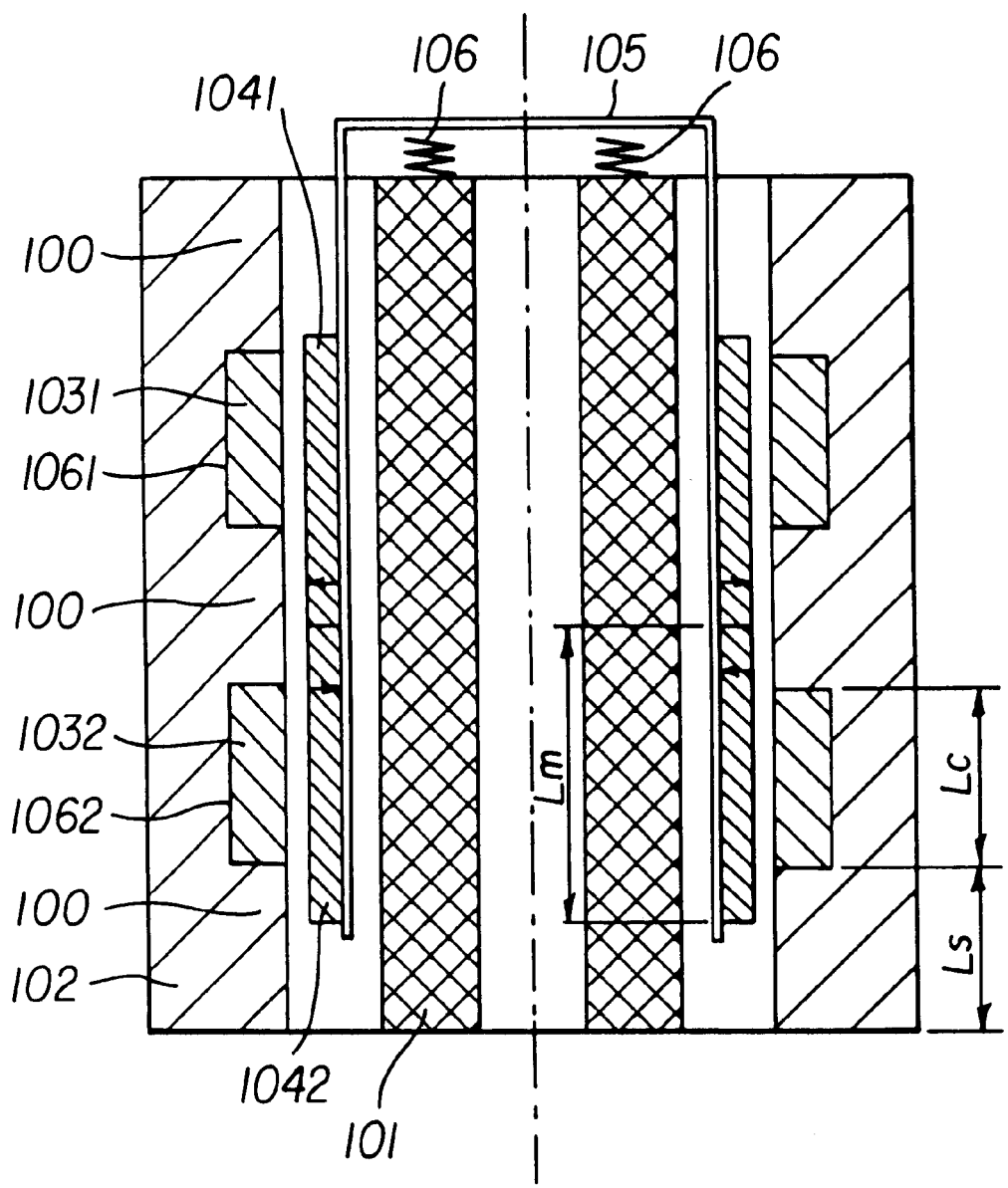
FIG. 17 shows a cross-sectional view of the actuator in accordance with a tenth preferred embodiment of the present invention.

FIG. 17 shows a cross-sectional view of an actuator in accordance with the tenth preferred embodiment of the present invention.

In FIG. 17, the following elements correspond to the elements explained in the first embodiment, having the same dimensions:

(a) inner yoke 101;

(b) outer yoke 102;

(c) magnet holder 105;

(d) held by magnet holder 105, permanent magnets 1041 and 1042 energized in each direction indicated by arrows in FIG. 17;

(e) driving coil 1031 wound around coil-disposed section 1061 of outer yoke 102;

(f) driving coil 1032 wound around coil-disposed section 1062 of outer yoke 102;

(g) magnetic pole 100 of outer yoke 102.

The actuator of the embodiment differs from that of the first embodiment in that collision avoidance spring 106 is disposed at the top end of inner yoke 101.

The working principle of the actuator of the embodiment structured above is the same as that of the actuator of the first preferred embodiment. As an advantageous feature, according to the embodiment, collision avoidance spring 106 disposed at the top end of inner yoke 101 prevents magnets 1041, 1042 and holder 105 from a possible damage, if the moving parts collide with inner yoke 101.

Collision avoidance spring 106, which is disposed at the top end of inner yoke 101 in the explanation above, may be disposed at the bottom of holder 105.

In addition, although the case in which coils 1031 and 1032 are wound around outer yoke 102 is discussed here, it is also effective that those coils are wound around inner yoke 101 instead.

Eleventh Preferred Embodiment

Figure 18:
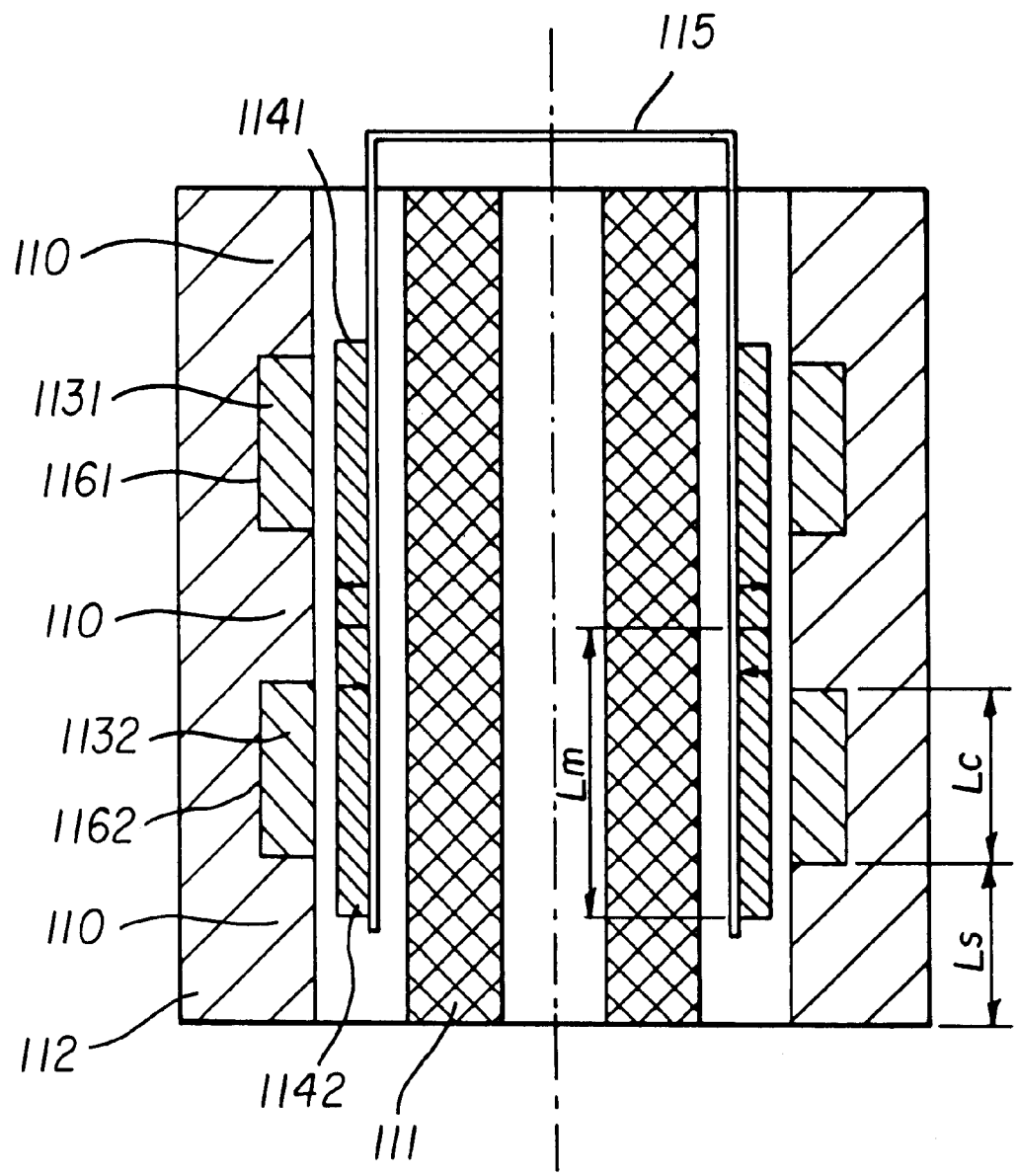
FIG. 18 shows a cross-sectional view of the actuator in accordance with an eleventh preferred embodiment of the present invention.
Figure 19:
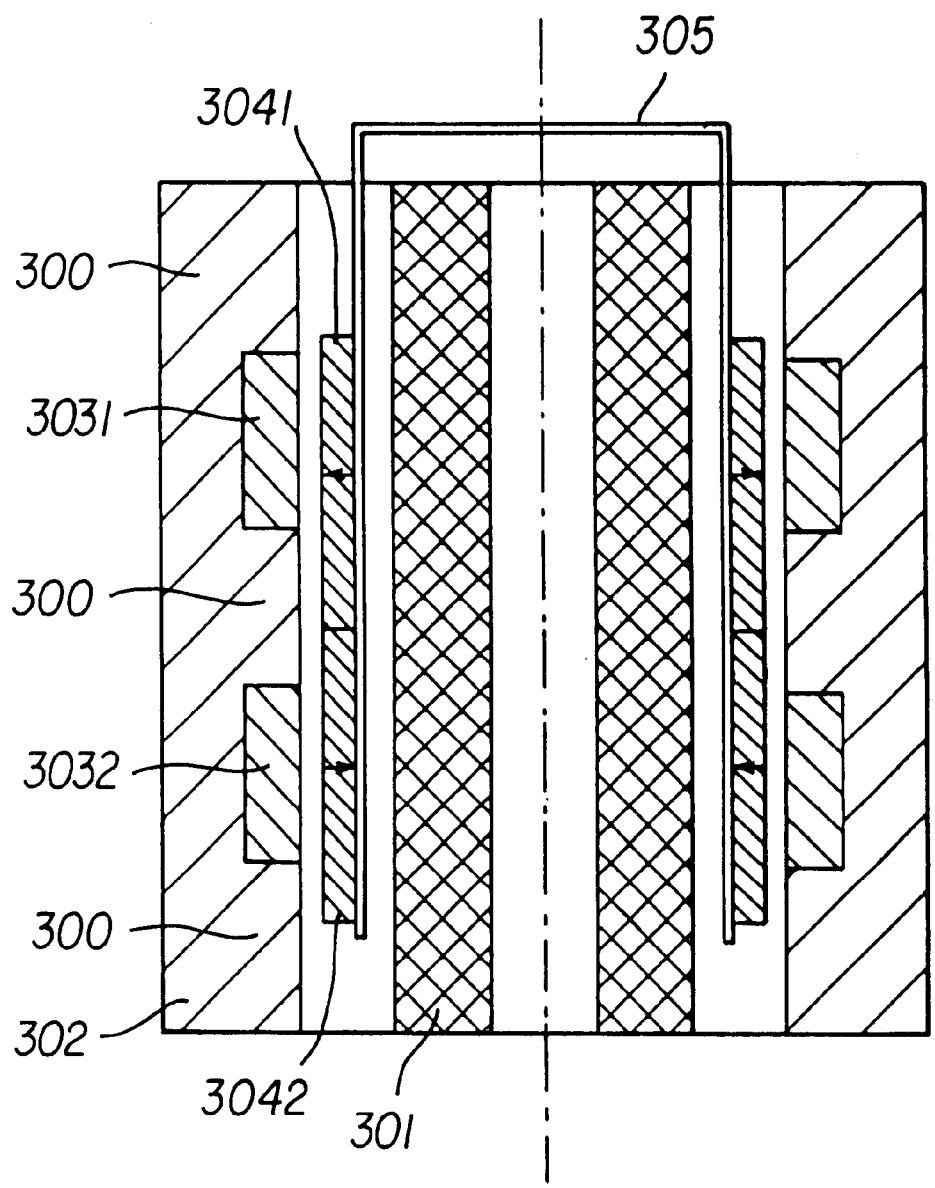
FIG. 19 shows a cross-sectional view of a conventional actuator.

FIG. 18 shows a cross-sectional view of an actuator in accordance with the eleventh preferred embodiment of the present invention.

In FIG. 18, the following elements correspond to the elements explained in the first embodiment, having the same dimensions:

(a) inner yoke 111;

(b) outer yoke 112;

(c) magnet holder 115;

(d) held by magnet holder 115, permanent magnets 1141 and 1142 energized in each direction indicated by arrows in FIG. 18;

(e) driving coil 1131 wound around coil-disposed section 1161 of outer yoke 112;

(f) driving coil 1132 wound around coil-disposed section 1162 of outer yoke 112;

(g) magnetic pole 110 of outer yoke 112.

The actuator of the embodiment differs from that of the first embodiment in that a magnetic material with high electrical resistance is employed for holder 115.

The working principle of the actuator of the embodiment structured above is the same as that of the actuator of the first preferred embodiment. As an advantageous feature, according to the embodiment, employing a magnetic material with high electrical resistance for holder 115 enables a cost effectively choice of the permanent magnet. That is, when magnets 1141 and 1142 have a higher permeance, for example, the thickness or magnitude of a magnetic force of the magnet can be reduced, promising a cost saved actuator.

Although the case in which coils 1131 and 1132 are wound around outer yoke 112 is discussed here, it is also effective that those coils are wound around inner yoke 111 instead.

According to the actuator of the present invention, as described in the embodiments above, dimensional requirements are defined for the magnetic poles and the magnets as follows:

(1) the axial length of each section of the magnetic poles is not less than the movable stroke; and (2) the axial length of the first magnet is equal to the sum of the axial length of a section of the magnetic pole and the axial length of the first coil-disposed section; similarly, the axial length of the second magnet is equal to the sum of the axial length of a section of the magnetic pole and the axial length of the second coil-disposed section.

With the structure described above, a magnetic force is effectively obtained for keeping a sufficient thrust. This allows the permanent magnets to be lightweight, which can advantageously save costs and resources. The lightweight of the magnets reduces the total weight of the whole moving parts, realizing a higher acceleration.

What is claimed is:

1. A linear actuator with movable magnets comprising:

(a) a cylindrical inner yoke;

(b) a magnet holder disposed concentrically with said inner yoke via a clearance;

(c) a first cylindrical magnet magnetized in a radial direction, and held by said magnet holder;

(d) a second cylindrical magnet magnetized in the radial direction opposite to that of said first magnet, and is held, as well as said first magnet, by said magnet holder in an axial direction; and (e) an outer yoke disposed concentrically with said inner yoke, having a first and a second coil-disposed sections around which a first and a second driving coils are wound, respectively, also having a plurality of magnetic poles that oppose, via the clearance, to at least one of said first magnet and said second magnet, wherein:
(1) an axial length of each section of said magnetic pole is not less than a movable stroke, and
(2) an axial length of said first magnet is equal to a sum of the axial length of a section of said magnetic pole and an axial length of said first coil disposed section, similarly, an axial length of said second magnet is equal to the sum of the axial length of a section of said magnetic pole and an axial length of said second coil-disposed section.

2. The actuator as defined in claim 1, wherein said first and said second magnets are separated in a circumferential direction.

3. The actuator as defined in claim 1, wherein at least one of said inner yoke and said outer yoke is separated in a circumferential direction.

4. The actuator as defined in claim 1, wherein at least one of said inner yoke and said outer yoke is a multi-layered structure made of thin plates, laminated in a circumferential direction.

5. The actuator as defined in claim 1, wherein at least one of said inner yoke and said outer yoke is the multi-layered structure made of thin plates, laminated axially and separated circumferentially.

6. The actuator as defined in claim 4, wherein the thin plates are magnetic plates with magnetic-direction characteristics.

7. The actuator as defined in claim 5, wherein the thin plates are magnetic plates with magnetic-direction characteristics.

8. The actuator as defined in claim 1, wherein said magnet holder is made of a non-magnetic material with high electrical resistance.

9. The actuator as defined in claim 1 wherein said magnet holder has a plurality of slits in an axial direction.

10. The actuator as defined in claim 1, wherein at least one of said. magnet holder's ends is L-shaped.

11. The actuator as defined in claim 1, wherein a cushioning material for collision avoidance is disposed on at least one of said magnet holder and said inner yoke.

12. The actuator as defined in claim 1, wherein said magnet holder is made of a magnetic material with high electrical resistance.

* * * * *